C. L. TOWNSEND.
MACHINE FOR TRIMMING AND FINISHING RUBBER GASKETS AND SIMILAR ARTICLES.
APPLICATION FILED MAR. 21, 1919.

1,314,029.

Patented Aug. 26, 1919.
2 SHEETS—SHEET 1.

Inventor:
Charles L. Townsend,
By Arthur H. Ewald,
Attorney.

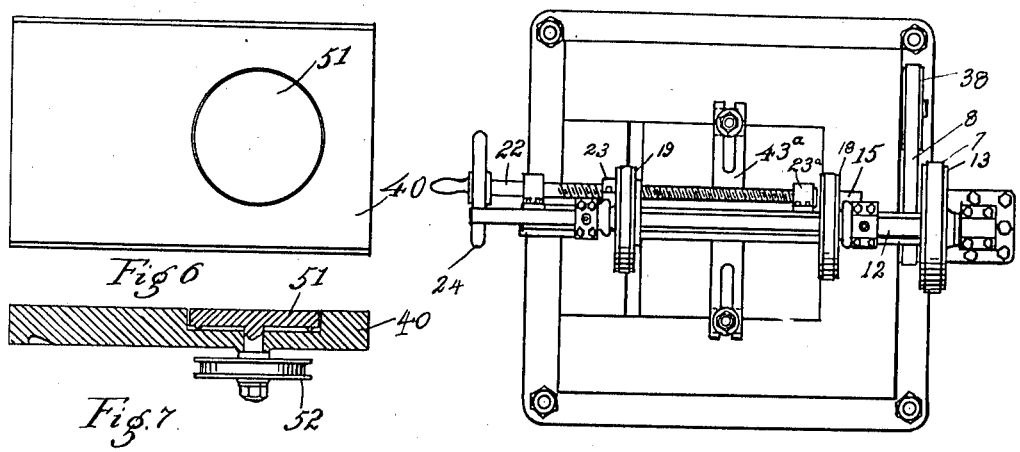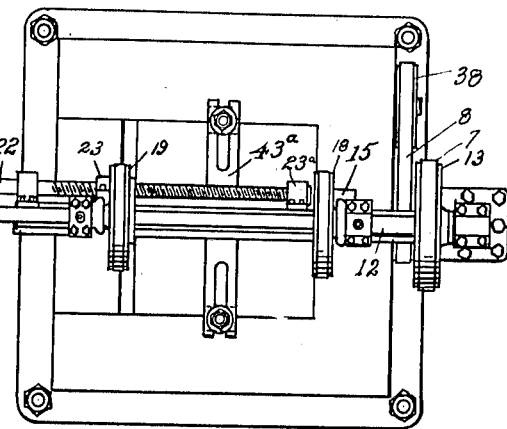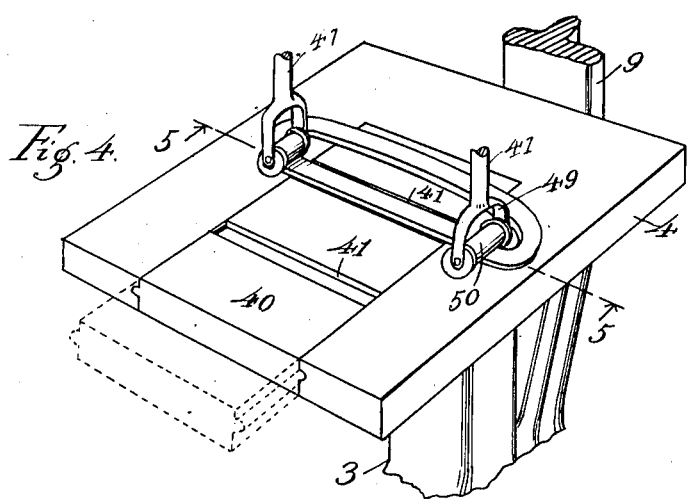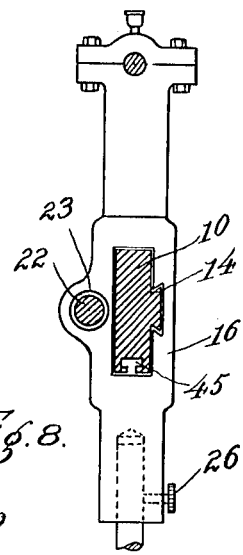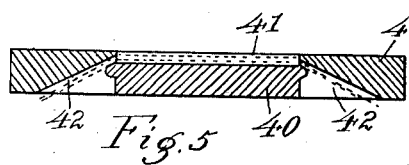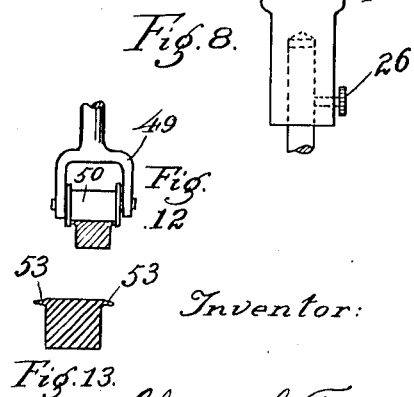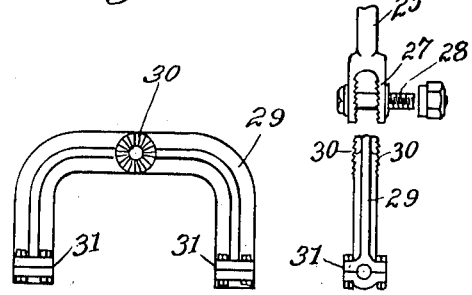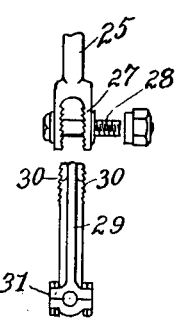

UNITED STATES PATENT OFFICE.

CHARLES L. TOWNSEND, OF NORWOOD, OHIO.

MACHINE FOR TRIMMING AND FINISHING RUBBER GASKETS AND SIMILAR ARTICLES.

1,314,029.  Specification of Letters Patent.  Patented Aug. 26, 1919.

Application filed March 21, 1919. Serial No. 284,147.

*To all whom it may concern:*

Be it known that I, CHARLES L. TOWNSEND, a citizen of the United States, and resident of Norwood, in the county of Hamilton and State of Ohio, have invented a certain new and useful Machine for Trimming and Finishing Rubber Gaskets and Similar Articles, of which the following is a full, clear, and exact description, reference being had to the accompanying drawings, forming a part of this specification.

The present invention relates to machines for trimming rubber gaskets and similar articles.

The principal object of said invention is to provide a machine adapted to trim the edges of rubber gaskets as the same may come from the molds.

A further object of the invention is to provide a machine of the character mentioned of simple, and yet efficient, construction.

Other objects of the invention will appear from the following detailed description thereof.

In the drawings Figure 1 is a front elevation of a machine constructed in accordance with the present invention.

Fig. 3 is a plan view of the machine.

Fig. 4 is a perspective of the work supporting table.

Fig. 5 is a section of said table on the line 5—5 of Fig. 4.

Fig. 6 is a plan of a modified form of slide for the table.

Fig. 7 is a sectional view of said modification.

Fig. 8 is a sectional view on line 8—8 of Fig. 1.

Fig. 10 is an elevation of one of the cutter supporting hangers.

Fig. 11 is an end view of the hanger and a portion of the supporting member, the parts being detached.

Fig 12 is an elevation of one of the rollers for securing the work in the machine.

Fig. 13 is a sectional view of a rubber gasket before trimming.

Figures 1, 2:
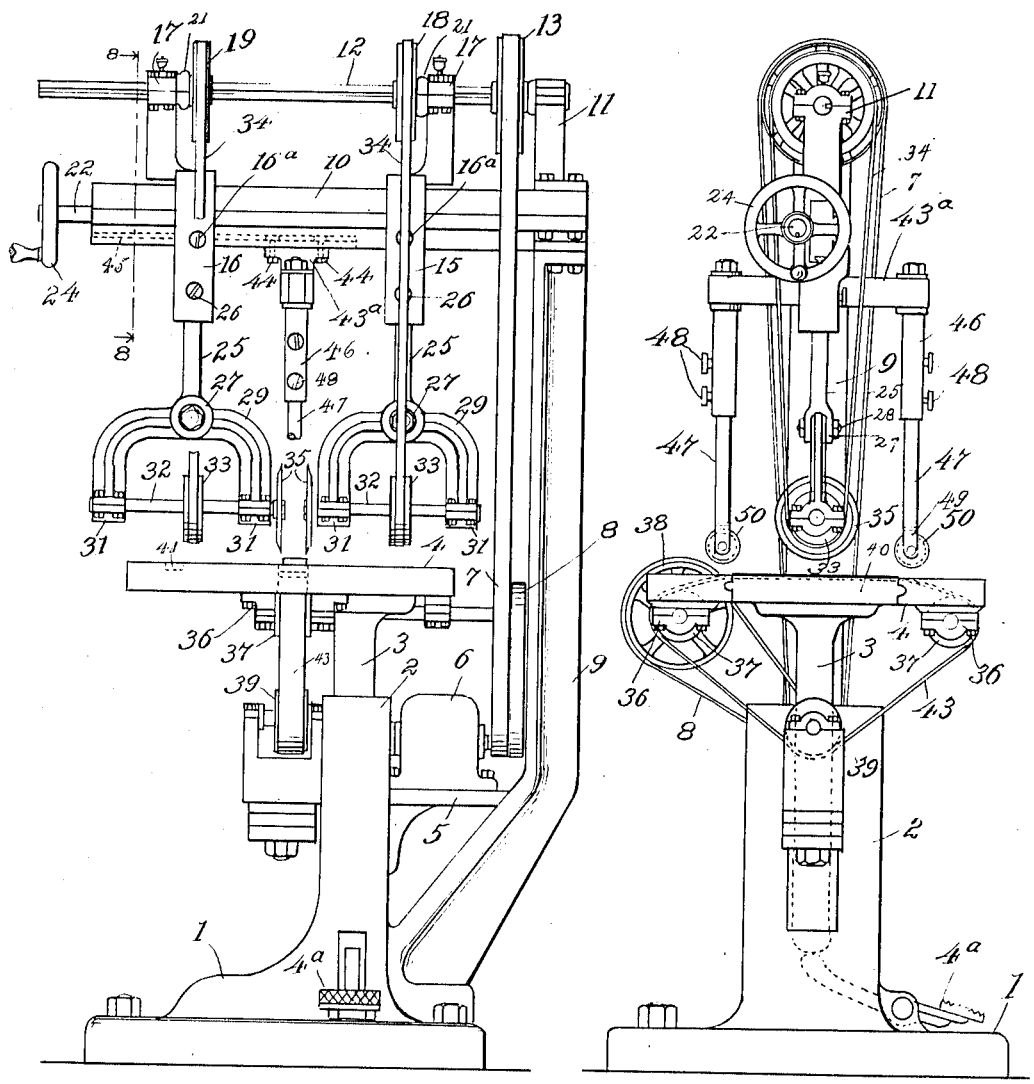
Fig. 2 is a side elevation of said machine.
Figure 9:
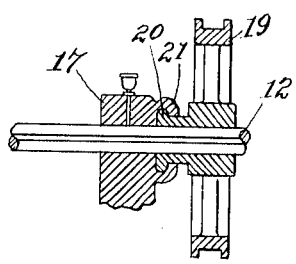
Fig. 9 is a sectional view of a detail.

The numeral 1 indicates a base member having a standard 2, within which a column 3 of a work supporting table 4 is mounted and arranged for vertical movement by means of a pedal 4ᵃ in accordance with ordinary construction. The standard 2 is also provided with a support 5 for a motor 6, upon one end of which is a pulley for driving belts 7 and 8. Mounted on the base member 1 is a second standard 9, in the upper end of which an arbor 10 is secured, the same being arranged to overhang the table 4. Mounted on the standard 9 is a bearing 11 for a shaft 12, upon which a pulley 13, arranged to be driven by the belt 7, is mounted. The arbor 10 is provided with an undercut flange 14, illustrated in section in Fig. 8. Mounted on the arbor 10 are hanger supports 15 and 16, the same being longitudinally adjustable on said arbor, and arranged to be secured by set screws 16ᵃ. The upper ends of the support 15 and 16 are provided with bearings 17 for the shaft 12; pulleys 18 and 19 are splined on the shaft 12, the latter being provided with a keyway throughout its length. The pulleys 18 and 19 are provided with clutch flanges 20, shown in Fig. 9, which are engaged by coordinate flanges 21 of the bearings 17. Longitudinal adjustment of the supports 15 and 16 on the arbor 10 will, therefore, effect similar adjustments of the pulleys 18 and 19 on the shaft 12.

Longitudinal relative adjustments between the supports 15 and 16 on the arbor are effected by means of a screw shaft 22, operating in a threaded bearing 23 provided in the support 16, the end of said shaft having a plain bearing 23ⁿ on the support 15; a hand wheel 24 is provided on the outer end of the shaft for the operation thereof.

Arranged to telescope in supports 15 and 16, are rods 25, set-screws 26 being provided to secure the rods in any desired vertical adjustment.

The free ends of the rods 25 are provided with internally toothed bifurcated ends 27, shown in Fig. 11, the same being perforated to receive bolts 28. Mounted in the ends 27 of the rods are yokes or hangers 29, having face members 30 provided with teeth arranged to engage the teeth of the ends 27. The yokes 29 are perforated to permit passage of the bolts and the yokes may thus be secured in any desired angular adjustment by means of the engagement of the respective teeth and said bolts. The ends of each of the hangers 29 are provided with bearings 31 for cutter shafts 32. Secured to the shafts 32 are pulleys 33, arranged to be driven respectively by the pulleys 18 and 19 and belts 34. Also secured to the ends of the shaft 32 are cutter disks 35.

On the underside of the table 4 are bearings 36 for pulleys 37. One end of the shaft for one of said pulleys is provided with a drive pulley 38, driven by the belt 8. Mounted in bearings on a support attached to column 3 is a pulley 39.

The table 4 is constructed with a removable slide 40, the top of which is provided with one or more transverse grooves 41, the said grooves being, if more than one, of varying widths and being so placed in the slide 40, that either of the same may be brought opposite cutaway portions 42 in the underside of the table. A continuous belt 43 operates over the pulleys 37—37 and 39 and through the groove 41, which has been positioned in alinement with the cutaway portions 42 of the table. The grooves 41 are of such depth that the upper surface of the belt when operating therein will be flush with the surface of the table.

Mounted on the underside of the arbor is a supporting bar, 43ª, the same being secured to the arbor by means of bolts 44, the heads of which are arranged to be secured in an undercut slot 45 in the arbor; the support 43 is thus longitudinally adjustable on the arbor. Secured to the ends of the bar 43 and adjustable in slots in said arm, are arms 46, within which rods 47, are arranged to telescope and to be secured by means of set-screws 48. The ends of the rods 47 have bifurcated heads 49, shown in Fig. 12, within which flanged rollers 50 are mounted.

In Figs. 6 and 7 I have illustrated a modified form of slide, in which form the slide 40 is provided with a rotatable platform 51, operable by means of a pulley 52 under the table, the said pulley being arranged to be driven by the belt 39. In this modified form the table is adapted for use in trimming rubber washers, etc.

The operation of the device, is as follows: The cutter disks 35 being properly adjusted relative to each other, and the slide 40 having been so placed in the table that a groove 41 of the required width is presented for the passage of the belt 39, a rubber gasket illustrated in section in Fig. 13 is placed over the belt. The arms 47, carrying rollers 50, are suitably adjusted so that when the table is raised the rollers will bear on the washer in the manner indicated in Fig. 12. The table is then raised by means of the pedal 4ª until the gasket is brought in position to be clamped by the rollers 50 and for being operated upon by the cutters 35. The machine is then set in operation and the belt carries the gasket under the cutter knives which, revolving, cut off the small unfinished edges 53 of the gasket, the same having been left thereon by the molds during manufacture. The gasket having been completely trimmed, the table is lowered and the gasket removed. In order to trim washers one of the cutters 35 is raised so that it will not act upon the washer. The washer is then placed upon the platform 51 and the general operations above set forth carried out. The rotation of the platform 51, as will be seen, presents the entire circumference of the washer to the action of the cutter.

It will be understood that various modifications may be made in the details of the above disclosure without departing from the spirit and scope thereof, the present invention consisting broadly in mechanism for trimming the edges of gaskets and washers by means of cutter knives instead of by grinding members which has been the universal practice heretofore.

Having thus fully described my invention what I claim is new and desire to secure by Letters Patent is:

1. A machine for trimming gaskets and similar articles, comprising a base member, a table mounted in said member and vertically movable therein, a cutter-member operably supported by said base member above said table, a belt arranged to operate through a groove in said table for rotating an article to be trimmed upon said table so as to present the edges thereof to said cutter-member to be acted upon thereby, means for moving said table toward and away from said cutter-member, means for driving said belt and arranged to be brought into actuating relation therewith by the raising of said table, and means for the operation of said cutter-member.

2. A machine for trimming gaskets and similar articles, comprising a base member, a table mounted in said member and vertically movable therein, a cutter member operably supported by said base member above said table, means for adjusting said cutter in relation to said table, a belt arranged to operate through a groove in said table for rotating an article to be trimmed upon said table so as to present the edges thereof to said cutter-member to be acted upon thereby, means for moving said table toward and away from said cutter-member, means for driving said belt and arranged to be brought into actuating relation therewith by the raising of said table, and means for the operation of said cutter-member.

3. A machine for trimming gaskets and similar articles, comprising a base member, a table mounted in said member and vertically movable therein, a pair of cutter members operably supported by said base member above said table, means for adjusting said cutter members relative to each other, a belt arranged to operate through a groove in said table for rotating an article to be trimmed upon said table so as to present the edges thereof to said cutter members to be acted upon thereby, means for moving said table toward and away from said cutter members, means for driving said belt and arranged to be brought into actuating relation therewith by the raising of said table, and means for the operation of said cutter-members.

4. A machine for trimming gaskets and similar articles, comprising a base member, a table mounted in said member and vertically movable therein, a pair of cutter members operably supported by said base member above said table, means for adjusting said cutter in relation to said table, means for adjusting said cutter members relative to each other, a belt arranged to operate through a groove in said table for rotating an article to be trimmed upon said table so as to present the edges thereof to said cutter members to be acted upon thereby, means for moving said table toward and away from said cutter-members, means for driving said belt and arranged to be brought into actuating relation therewith by the raising of said table, and means for the operation of said cutter-members.

CHARLES L. TOWNSEND.